Oct. 6, 1936.  L. L. SCHAUER  2,056,910
HYDRAULIC MOTOR UNIT
Filed Feb. 16, 1934   3 Sheets-Sheet 1
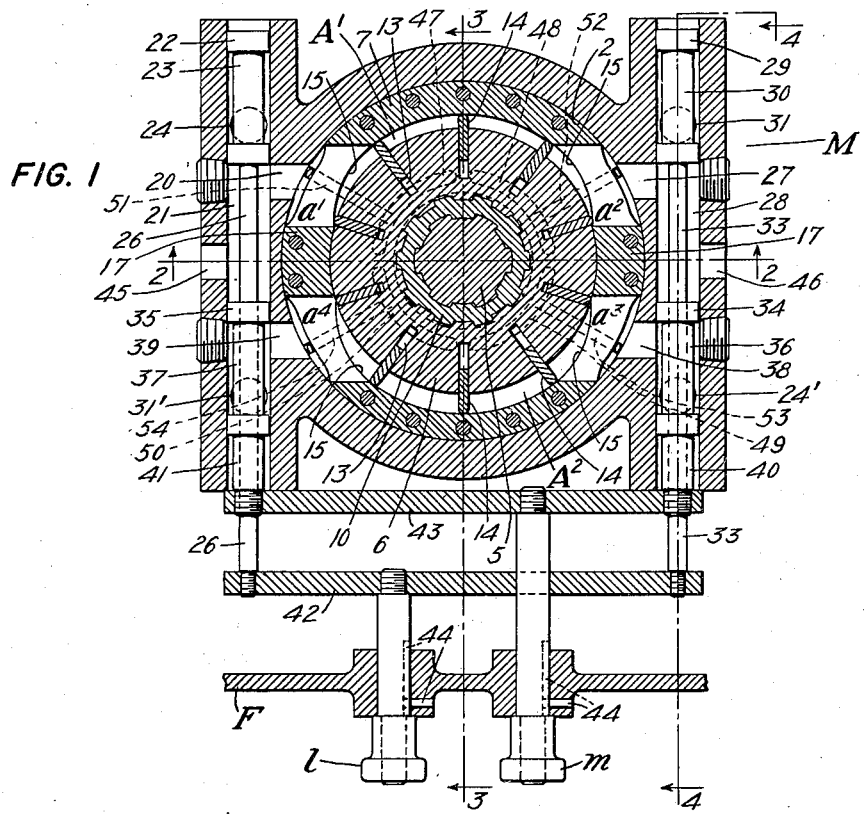
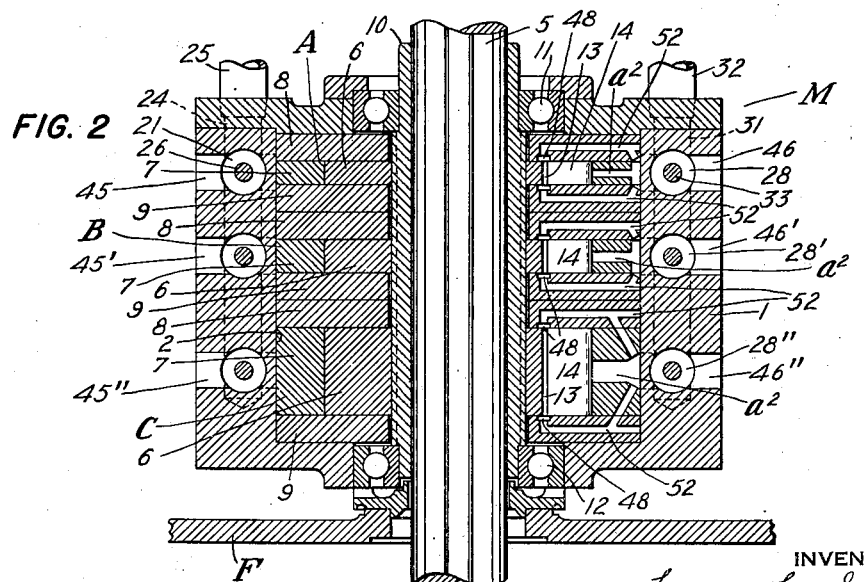
INVENTOR
Lawrence Lee Schauer
BY
Nathan, Bowman & Helferich
ATTORNEYS Oct. 6, 1936.  L. L. SCHAUER  2,056,910
HYDRAULIC MOTOR UNIT
Filed Feb. 16, 1934  3 Sheets-Sheet 2
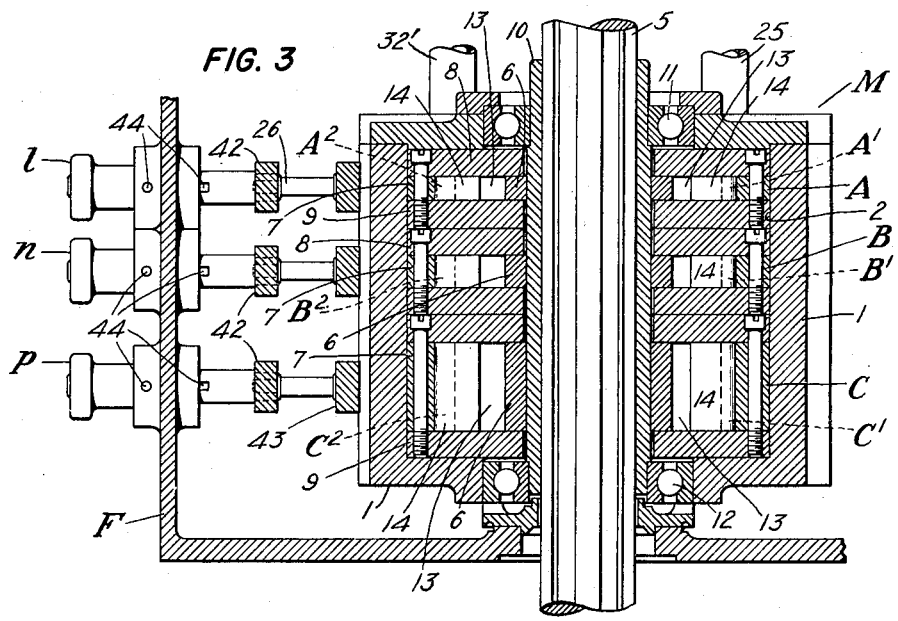
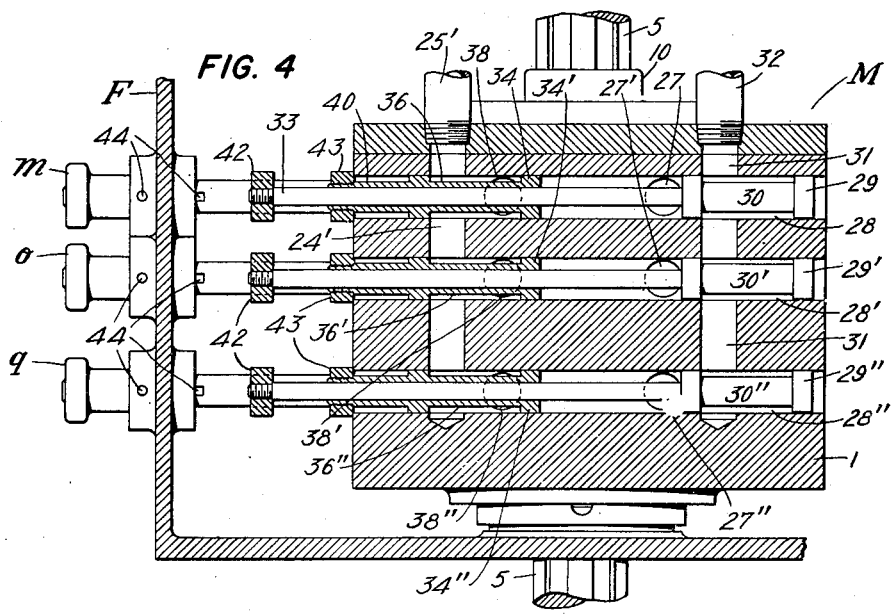
INVENTOR
Lawrence Lee Schauer
BY
Nathan, Bowman & Helferich
ATTORNEYS Oct. 6, 1936.  L. L. SCHAUER  2,056,910
HYDRAULIC MOTOR UNIT
Filed Feb. 16, 1934  3 Sheets-Sheet 3

INVENTOR
Lawrence Lee Schauer
BY
Nathan, Bowman & Helferich
ATTORNEYS

Patented Oct. 6, 1936

2,056,910

UNITED STATES PATENT OFFICE 2,056,910

HYDRAULIC MOTOR UNIT

Lawrence Lee Schauer, Wyoming, Ohio, assignor to The Cincinnati Bickford Tool Company, Cincinnati, Ohio, a corporation of Ohio Application February 16, 1934, Serial No. 711,562

17 Claims. (Cl. 121—92)

This invention relates to hydraulic transmissions and more particularly to a variable speed transmission of the multiple rotor type and has for a primary object to propel an element at any one of a plurality of different fixed speeds through the medium of oil, or other non-compressible fluid, derived from a constant source.

A further object of the invention is to render any one of the fixed speeds obtained capable of variation so as to produce a range of intermediate fixed speeds and, as a refinement to render any one of the fixed or intermediate speeds obtained, capable of still further variations and thereby to obtain an infinite range of speeds.

Still another object of the invention is to obtain a plurality of different speeds from a hydraulic unit and to accompany each of the major or fixed speed changes with an inversely proportionate change in motor torque. In the driving of machine spindles, this feature is highly advantageous for in such cases the larger tools or workpieces are driven relatively slowly and require a good deal of power. On the other hand the smaller work or tools are driven considerably faster but because of the nature of the tooling operation and/or the strength of the tool or workpiece, they should be driven with decreased power.

Another object is to design variable speed hydraulic transmission and control means therefor with but few moving parts and to arrange the various elements in a compact manner preferably in a single casing which may be conveniently located with respect to the elements to be driven thereby and thus decrease power losses by the elimination of intermediate drive gearing and shafting.

In carrying out the objects of this invention it is proposed to mount a plurality of hydraulic rotor units in a single casing, each rotor and cooperating stator element forming a unit in which two or more hydraulic motors are provided, each motor differing in size and volumetric capacity from each other and from the motors of other units. Independently operable valve means having connections with the source of supply are provided for each motor of each of the rotor sets whereby the driven shaft may be driven by any one motor of any of the several sets and thereby at any preselected speed, or by any two or more motors of the several sets to obtain various other and intermediate speeds. So that the motors that are not in the circuit at a given time do not operate against a resistance or produce any lag on the driven shaft, the valve means is so arranged that when a given motor is cut out of the circuit, equal pressures exist on opposite sides thereof and the oil therein merely circulates against a zero head.

Speeds intermediate the intermediate speed above mentioned are readily obtainable by throttling the inlet or discharge fluid, if the system is of the constant pressure type, and by varying the supply, as by by-passing a fraction thereof or changing pump delivery, if the system is of the constant supply type.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a horizontal sectional view through the motor unit showing the arrangement of the ports and valves for one of the rotors.

Fig. 2 is a vertical section through the unit taken along line 2—2 of Fig. 1.

Fig. 3 is a vertical section taken along line 3—3 of Fig. 1.

Fig. 4 is a vertical section taken along line 4—4 of Fig. 1.

In my former application, Serial No. 675,652, filed June 14, 1933, there is disclosed a variable speed hydraulic unit and a preferred embodiment thereof in a machine tool of the drilling machine type and it will be understood that the motor unit presently to be described is adaptable to like as well as other uses.

Figure 7:
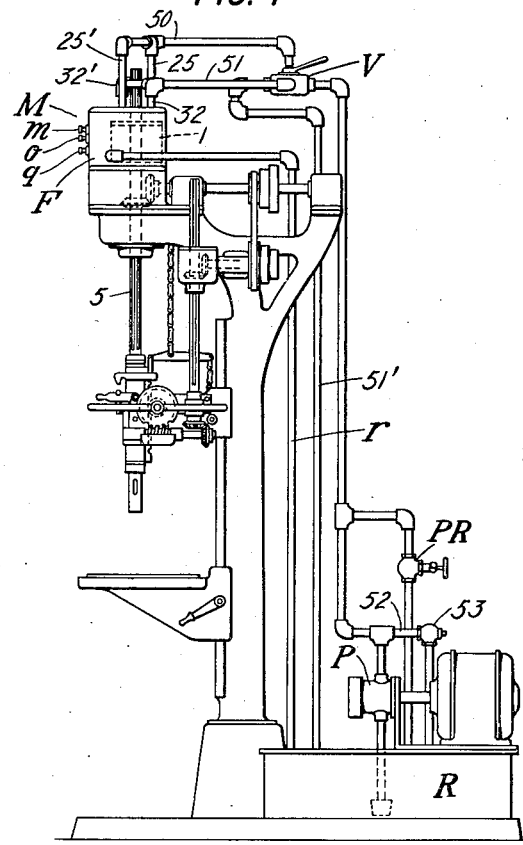
Fig. 7 is an elevational view of a representative type of machine tool embodying the present invention.

Fig. 7 exemplifies one use for the present invention and inasmuch as the machine there shown is described in detail in my earlier application and in United States Patent No. 1,746,265, further description thereof is believed unnecessary here. Suffice it to say that the shaft 5 is the driven shaft and which may, as shown in Figs. 2 and 7 of the drawings, be translatable with respect to the hydraulic driving unit indicated generally as M, or it may be non-translatable according to the intended use and function of the transmission.

The motor unit M consists of a fixed casing 1 provided with a bore 2 within which is snugly fitted and keyed a plurality of rotor sets A, B and C, in axial alignment. Each of the rotor units comprises a rotor element 6 and a stator element 7 which are faced on opposite sides with valve plates 8 and 9, the rotor element in each set having a keyed connection with a sleeve 10 which in turn is keyed or splined to the shaft 5. As shown in Figs. 2 and 3 the sleeve 10 is journaled at its ends in anti-friction bearings 11 and 12 provided in the ends of the fixed casing 1. In cases where a translatable shaft is unnecessary, the sleeve 10 may be extended and serve as the driven shaft.

The rotor sets A, B and C are each alike in that each partakes of the functions of two motors of different volumetric displacement and horsepower rating and this is accomplished as follows: Referring to the rotor unit A illustrated in cross section in Fig. 1 it will be seen that the stator element 7 is formed with two elongated power chambers $A^1$ and $A^2$ oppositely disposed in its inner periphery. Each of the power chambers $A^1$ and $A^2$ communicates respectively with inlet passages $a^1$ and $a^3$ and discharges passages $a^2$ and $a^4$ forming part of an hydraulic circuit later to be explained in detail. The rotor element 6 is provided with a plurality of recesses 13 within which are slidingly fitted vanes 14. In the present case a 10 vaned rotor is illustrated but it is obvious that the number of vanes may be changed to suit certain conditions.

Each end of the power chambers $A^1$ and $A^2$ are inclined as at 15 and merge into the inner periphery of the stator element, the inclined portions 15 of the power chambers extending not more than the full annular length of the fluid passages $a^1$, $a^2$, $a^3$ and $a^4$.

Fluid entering passage $a^1$ is caused to fill the power chamber ahead of one of the vanes 14 and tends to move the preceding vane angularly and as the power chamber increases in size in the direction of movement, the angular movement continues until the succeeding vane cuts off the supply fluid. The fluid thus trapped between two vanes is carried around further by the action of succeeding vanes until the first mentioned vane reaches the discharge port $a^2$ and opens the entrapped fluid to the exhaust. Continued angular movement of the vane against the cam surface 15 causes the vane to be moved inwardly until it passes under the bridge portion 17 of the stator. The vane next following repeats the above cycle and in this way the incoming fluid is transferred in measured quantities from one side of the rotor to the other and in so doing propels the rotor. The unit of measure is the volumetric capacity of the chamber between two vanes, and this value multiplied by the number of vanes will give the amount of fluid transferred for one revolution of any given motor of the set. If the source of supply fluid is constant, the speed of movement of the driven shaft 5 may be determined within close limits.

The power chamber $A^2$ of the rotor A functions in a manner identical with the power chamber $A^1$. The chamber $A^2$ is, however, preferably made different in size so that its volumetric capacity is not equal that of chamber $A^1$. Fluid under pressure entering the passage $a^3$ is directed against the vanes 14 of the rotor and propels the same angularly and in the same direction, and if the flow of oil is constant, as before, the rate of rotor movement now obtained will differ from the rate obtained when using chamber $A^1$ and the difference will be in proportion to the difference in size of the respective power chambers. In this way one rotor and one stator element perform the functions of two independent motors, a "first" motor and a "second" motor, either of which may be propelled independently of the other or both together thereby to obtain different speeds with proportionally different torque values.

Each of the units B and C are constructed similar to the unit A, that is, each unit performs the functions of two motors, making, in the present example, six motors in all. And if each motor is a different size and used singly, six different rates of speed may be produced, or if any one motor is used in combination with any one or more other motors, as many as sixty-three different and selectively available speeds may be obtained.

How the speeds may be made selectively available will now be explained, reference being made particularly to Figs. 1, 2 and 4 of the drawings. As shown in these figures each of the two motors of each rotor set is provided with its own set of valves, and inasmuch as the valves are substantially all alike a description of but one of them is deemed sufficient.

Referring now to Fig. 1 it will be noted that the inlet passage $a^1$ of rotor A communicates at all times with a passage 20 which in turn communicates with the transversely arranged bore 21 of a valve cylinder. Slidably mounted within the bore 21 is a valve plunger 22 which is provided with a reduced portion 23 intermediate its ends. This reduced portion is always in liquid communication with the supply fluid entering the passage 24 by way of the conduit 25. The valve plunger 22 has a rod 26 secured thereto by which the plunger may be shifted in its cylinder to open or close the passage 20 from the supply fluid.

The discharge passage $a^2$ of power chamber $A^1$ also communicates continuously with a passage 27 which in turn communicates with the bore 28 of another valve cylinder. Within the cylinder 28 is a valve plunger 29 having a reduced portion 30 intermediate its ends always communicating with an exhaust passage 31 and conduit 32. This valve plunger also has a valve rod 33 connected therewith so that same may be shifted to a position opening passages 27 and 31 or to the position shown in Fig. 1 wherein the passages mentioned are closed off.

When the valves 22 and 29 are in the position shown in Fig. 1 fluid pressure is prevented from actuating the "first" motor, but when both valves 22 and 29 are moved inwardly to their other extreme positions the fluid from the supply conduit 25 passes through passage 24, around reduced portion 23, through passages 20 and $a^1$ to the power chamber $A^1$ and drives the rotor. The fluid exhausted therefrom passes through passages $a^2$, 27, around reduced portion 30, and through the passage 31 to a reservoir or back to a supply pump by way of conduit 32.

The "second" motor incorporating the power chamber $A^2$ is controlled in a similar manner but in this case the passage 24' is the supply passage and 31' the discharge passage, each of which communicates respectively with supply and discharge conduits 25' and 32'. Valve plungers 34 and 35 also slidable in the bores 28 and 21 respectively, control the flow of pressure fluid to and from the second motor. When the valves 34 and 35 are in the position shown in Fig. 1 fluid from a supply conduit 25' enters passage 24' flows around the reduced portion 36 of the valve plunger 34, through passages 38 and $a^3$ to the power chamber $A^2$ and propels the rotor. The fluid discharged thereby passes out passages $a^4$ and 39, around reduced portion 37 of the valve 35, to passage 31' and discharge conduit 32'. Each of the valves 34 and 35 are provided with extensions 40 and 41 by which they may be moved to their opened or closed position.

Figure 5:
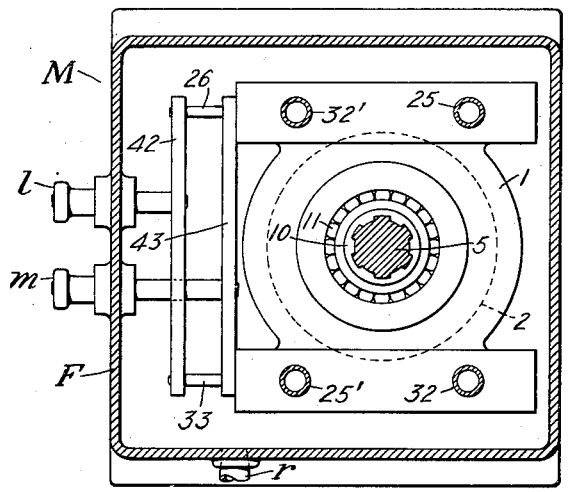
Fig. 5 is a plan view of the motor unit.

Thus it will be seen that the valves 22 and 29 control the actions of the first motor and the valves 34 and 35 control the action of the second motor of the rotor unit A, the valves of each set being interconnected to insure proper action. Figs. 1 and 5 illustrate most clearly one form of mechanism for accomplishing that end, and, in respect to valves 22 and 29, comprises a connecting bar 42 to which are secured the valve rods 26 and 33 (which pass through the valves 34 and 35) and an actuating handle $l$ of the push-pull type. Similarly, the extensions 40 and 41 of valves 34 and 35 are connected to a bar 43 which also is provided with a handle $m$. In operating the valves, the operator merely actuates the handles $l$ and $m$ to the required positions and since the valves are each hydraulically balanced, little or no effort is required to move the valves or to hold them in adjusted position.

Each of the motors in the other units B and C are constructed similar to and controlled as the motors of the unit A, above explained, that is, each rotor embodies two or more motors of different sizes and capacities and each motor has its own control valve means and therefore the units B and C need not be described in detail.

In order that the operation of one set of valves for any one motor does not affect the operation of any other motor the valving and conduits may be arranged as illustrated in Fig. 4. In that figure it will be noted that the before-mentioned exhaust passage 31 that communicates with the bore 28 between the raised lands of plunger 29, also communicates with the bores 28' and 28" associated with the rotors of units B and C at the same relative points. Accordingly, when valve plunger 29 is moved to a position establishing communication between exhaust passages 27 and 31 of rotor A, that movement does not of itself close off communication between passage 31 and the other cylinders, nor does the movement of plunger 29 to open the first motor of unit A to the discharge open the first motors of either of the units B or C to the discharge. Valve plungers 29' and 29" may likewise be moved to open or close their respective discharge passages without effecting the discharge from any other motor.

In the same manner the inlet conduit 25' and passage 24', shown in Fig. 4, communicate at all times with the cylinders 28, 28' and 28" between the raised spaced lands of plungers 34, 34' and 34" and accordingly any of these plungers may be moved to open or close the inlet passages of any of the "second" motors of any unit without effecting in any way the operation of any of the others. The inlet passage 24 and the exhaust passage 31' are arranged in a like manner, as will be understood. With such a construction any one or more motors of any of the units may be cut in or out of the circuit without interfering with the functions of any other motor.

As before explained, the valves of the unit A are interconnected and operated by the handles $l$ and $m$, the valves of units B and C are also interconnected and are actuated by the handles $n$ and $o$, and $p$ and $q$ respectively, and to facilitate controlling operations all of the control elements $l$, $m$, $n$, $o$, $p$ and $q$ are centralized to form a convenient control panel on the main casing F of the transmission, or in the frame of the machine in which the transmission may be installed. A pin and slot connection 44 is associated with each of the control elements $l$, $m$, $n$, $o$, $p$, and $q$ to control and limit the movements thereof.

It will be remembered that each of the rotor elements 6 is keyed to the driven element and, therefore, irrespective of which motor is effecting the driving action, all rotors will turn with the shaft 5 and those rotors which are turning idly normally tend to act as pumps and produce a retarding effect on the driven shaft. To obviate this difficulty pressure equalizing ports 45 and 46 are formed in valve cylinders 21 and 28 respectively, intermediate the near ends of the two valve plungers therein. With the valves in the position shown in Fig. 1, the "second" motor of rotor A is propelling the driven shaft and is receiving fluid through passages 24' and exhausting through passage 31', and the "first" motor is turning idly. When the supply and exhaust ports of the "first" motor are closed off, as shown, the passages 20 and $a^1$ become suction passages and the passages 27 and $a^2$ pressure passages. However, since the passage 20, in this position of the valves communicates with the open port 45, and the passage 27 with the open port 46, the pressures on both sides of motor are balanced and consequently no lag on the driven shaft occurs.

Similarly, if control element $m$ is pulled outwardly thereby cutting the "second" motor of unit A out of the circuit, passages 46 and 38, and 39 and 45 are connected and the pressures on opposite sides of the "second" motor are maintained equal.

The rotor units B and C are also provided with pressure balancing ports 45' and 46', and 45" and 46" respectively and accordingly any motor may be cut out of the circuit without producing any lag on the driven shaft or effecting in any way the operation of the other motors remaining in the circuit.

Figure 6:
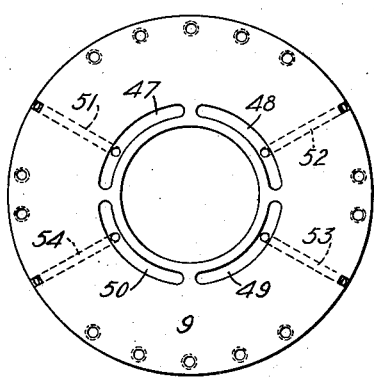
Fig. 6 is a plan view of the lower valve plate of one of the stator elements.

Proper and timely valve action of the vanes of the respective rotor units is insured by means now to be described. Each of the vane recesses 13 is adapted to be brought into communication with supply and exhaust fluid channels at predetermined points in their angular movement. This is accomplished by forming arcuate passages in the adjacent faces of the stator discs 8 and 9, as shown more clearly in Figs. 1 and 6. Referring more particularly to those figures the arcuate passages 47, 48, 49, 50 are four in number and disposed one in each of the quadrants containing the fluid passages $a^1$, $a^2$, $a^3$, and $a^4$. Fluid conduits 51, 52, 53 and 54 connect the arcuate passages preferably with the fluid passages $a^1$, $a^2$, $a^3$ and $a^4$ respectively. Hence, fluid pressure entering the passage $a^1$ leading to the power chamber $A'$, also passes through passage 51 to the arcuate passage 47 and as this passage communicates directly with the recesses 13 at the rear of the vanes, the fluid pressure acting therein tends to move the vanes outwardly during their angular movement in that sector. As the vanes turn with the rotor the fluid pressure acting at the rear of any given vane is cut off before the vane reaches the incline at the end of the power chamber and the fluid trapped in the recess is allowed to escape through the passages 48 and 52 to the discharge port. Further turning of the rotor causes the vane to recede and expel the entrapped fluid. Before the vane reaches the next succeeding power chamber, in this instance power chamber A², the recess at the rear of the vane is cut off from the discharge conduit 48, and is opened to the arcuate conduit 49. The conduit 49 communicates with the passages $a^3$ and 38 and if these latter passages are in communication with supply pressure, the supply pressure tends to move the vane outwardly in the same manner as before. If the passages $a^3$ and 38 are closed off from the supply pressure in conduit 24', communication is established between the passages $a^3$ and 38 and the pressure balancing port 46. The arcuate conduit 50 on the discharge side of this motor connects with the discharge port $a^4$ through the conduit 54 as will be understood.

The operation of a transmission constructed as above explained, is as follows: Assuming that the supply conduits 25 and 25' are connected to the same source of supply fluid and that the supply is constant, say 18 gallons per minute. If the capacity of the first motor of unit A is 1.67 cu. in. per revolution, the speed of the driven shaft will be approximately 2500 R. P. M., if only this motor is used. If only the second motor of rotor A is used and its displacement capacity is 2.785 cu. in. per revolution, the speed of the driven shaft will be approximately 1495 R. P. M. But if both motors of the unit A are used conjointly, their total displacement is 4.455 cu. in. per revolution and therefore the speed of the driven shaft will be approximately 935 R. P. M. Preferably the volumetric displacement of each of the six motors herein illustrated increase progressively, that is, the second motor of unit A is larger than the first motor of unit A, and the first motor of unit B is larger than the second motor of unit A but smaller than the second motor of unit B, and so on. And also, the displacement of each succeeding motor is greater than the total displacement of all of the preceding motors in order to effect relatively coarse changes in the speed of the driven shaft. The finer and intermediate speed changes are effected by coupling-in one or more additional motors. Thus, with a six motor transmission it is possible to obtain six independent and relatively coarse changes in speed of the output shaft, and fifty-seven intermediate and finer changes in speed by combining two or more motors, making a total of sixty-three different speeds selectively available. And it will be noted that each reduction in speed is accompanied by an increase in power because of the increase in the vane areas subjected to the incoming fluid. The addition of one or more rotors will obviously greatly compound the above speeds. It is believed, however, that the foregoing explains the principles involved and no further examples are required.

Figure 8:
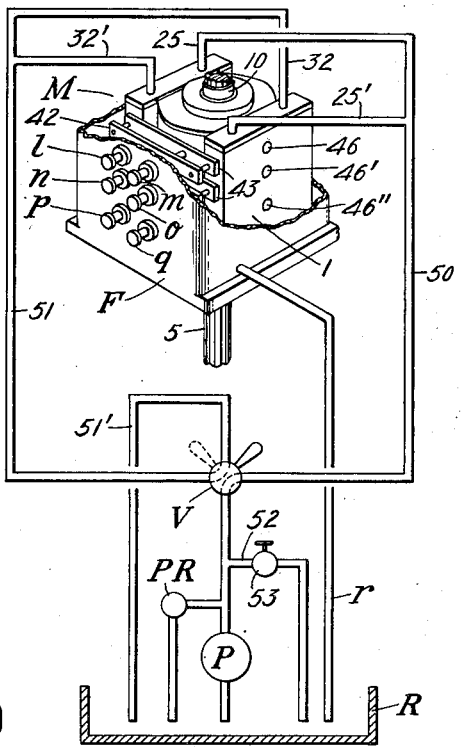
Fig. 8 is a diagrammatic view of one form of hydraulic circuit for the transmission.

In cases wherein it is desired to obtain a speed intermediate any of the fixed speeds obtainable in the manner just explained, it is proposed to vary the supply. The diagrammatic circuit illustrated in Fig. 8 illustrates one method of varying the rate of flow of the supply fluid. As shown in this figure the supply conduits 25 and 25' are connected to a main supply pipe 50, but it is obvious that they may be connected with different sources if desired. The main pipe 50 connects with the source of supply, here indicated as a pump P which draws fluid from a reservoir R. Likewise, the flow in the discharge conduits 32 and 32' may combine into one main discharge conduit 51 and 51' leading to the reservoir. A branch conduit 52, in which a throttle valve 53 is located, connects with the main line 50, for the purpose of by-passing a fraction of the fluid supplied by the pump P. When the throttle 53 is closed, all the fluid from the source P passes to the transmission units A, B and C through the line 50 but if the throttle be partly "open" the flow from the source P is apportioned between conduits 50 and 52 whereby the volume of flow to the transmission units A, B and C is decreased. As a consequence the speed of the shaft 5 is also decreased and in this manner the increments of rate change are made still finer. A high pressure relief valve PR is connected to the supply line to prevent the occurrence of excessively high pressures in the system.

A further feature of this invention is the ease in which the direction of motion of the driven shaft 5 may be reversed. To accomplish that end all of the fluid inlet and outlet ports and conduits formed in the motor unit M are symmetrically arranged, so that either set of ports may serve as the fluid inlet ports. When so constructed a conventional reversing valve V is placed across the conduits 50 and 51, as shown in Fig. 8 and the direction of the flow of fluid through the conduits 50 and 51 readily reversed. The reversal of the flow by means of the reversing valve also reverses the pressure connections at the rear of the vanes. For example, instead of arcuate conduit 47 being the high pressure conduit it now becomes the low or discharge pressure conduit, and conduit 48 becomes the high pressure conduit in which the fluid flows to advance the vanes as the rotor turns in the reverse or counter clockwise direction. The functions of the pressure relieving ports 45 and 46 also are not altered by reversing the direction of movement but continue to perform their intended function of maintaining equal pressures on opposite sides of idle motors. Any seepage of fluid through the pressure balancing ports or any leakage from other points of the unit collects in the casing F from whence it may be drawn off to the reservoir through the drain line r.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. A variable speed hydraulic transmission combining a driven shaft; a plurality of independent rotary motor assemblies of different diameters mounted on said shaft, each of said assemblies being of a different hydraulic displacement per revolution and each assembly comprising an individual rotor and a cooperating stator element; a source of constant liquid supply; and valve means for each of said motor assemblies operable independently and selectively to direct said liquid supply through any one or any two or more of said assemblies thereby to drive said shaft any one of a plurality of different speeds.

2. A variable speed hydraulic transmission combining a driven shaft; a plurality of independent motor assemblies mounted on said shaft, each of said assemblies being of a different hydraulic displacement per revolution and each assembly comprising an individual rotor and a cooperating stator element; a source of constant liquid supply; a liquid reservoir; independent valve means for each of said motor assemblies operable selectively to direct said liquid supply through any one or any two or more of said assemblies thereby to drive said shaft any one of a plurality of different speeds; and means for opening both sides of the idle motor assemblies driven by said shaft to said reservoir.

3. A variable speed hydraulic transmission combining a plurality of independently assembled hydraulic motors, each of said motors being of a different axial length and volumetric capacity per unit of length; a driven shaft common to all of said motors; a constant source of fluid supply; separate valve means for each of said motors operable independently to direct said supply fluid selectively through any one or any two of said rotors whereby said shaft will be driven at a rate proportionate to the size of the particular motor or motors connected in the circuit; and means operable to effect a balancing of the pressures on opposite sides of the motors remaining idle.

4. In combination a shaft, a plurality of independent hydraulic motors connected therewith, each of said motors being of a different axial length and of different capacity per unit of length; a liquid supply conduit for each of said motors adapted to be connected with a constant source of liquid supply; valve means in each of said liquid supply conduits operable to direct liquid from said source selectively through any one or any selected group of said motors whereby said shaft will be driven at a rate proportionate to the size of the particular motor or motors selected; and means isolating both sides of the idle motors from said supply.

5. A variable speed hydraulic transmission combining a driven shaft; a plurality of independent motor assemblies mounted on said shaft, each of said assemblies being of a different diameter and each assembly comprising an individual rotor and a cooperating stator element; a source of constant liquid supply; a liquid reservoir; valve means for each of said motor assemblies operable selectively to direct said liquid supply through any one or any two or more of said assemblies thereby to drive said shaft any one of a plurality of different speeds; means for opening both sides of the motor assembly remaining out of the circuit to atmospheric pressure; and means for diverting a fraction of said constant supply of liquid from said transmission to effect propulsion of the motor assemblies with the remaining fraction to obtain a variation in speed of the driven shaft independently of the number of assemblies connected with said source.

6. An hydraulic power transmitter combining an outer casing; an inner casing; a driven shaft extending through both of said casings; a plurality of independent hydraulic motors in said inner casing and operatively connected with said shaft; independently operable valve means provided in said inner casing for controlling the flow of a pressure liquid selectively through any one of said motors independently of the other or through any two or more of said motors simultaneously; and means maintaining opposite sides of the motor or motors ineffective to drive said shaft open to said outer casing; and means operable from the exterior of said outer casing for actuating said valve means.

7. An infinitely variable multiple speed hydraulic transmission combining a casing; a driven shaft journaled thereon; a plurality of hydraulic rotors secured to said shaft and enclosed in said casing; a main supply conduit and a main discharge conduit; a plurality of branch conduits connected with said rotors, each of said branch conduits connecting one of the said main conduits with each of the said motors; a separate inlet control valve and a separate discharge control valve in the branch conduits of each of said motors; selectively operable means for actuating the control valves of any one motor or of any two or more motors to an effective position thereby to cause said rotors to be propelled and said shaft to be driven at any one of various predetermined speeds; means for reversing the direction of movement of said shaft; and means for varying the rate of movement of the shaft in either direction of movement independently of said control valve means.

8. An hydraulic motor of the vane type combining a rotor element and a stator element, said rotor element being provided with a plurality of vane recesses and said stator element with a plurality of power chambers; vane members reciprocably mounted in the recesses formed in the rotor element and adapted to cooperate with said power chambers; fluid inlet and a fluid discharge conduit for each of said power chambers; valve means associated with each of said conduits for controlling the flow of fluid to and from the respective power chambers; fluid pressure means normally tending to move said vane members outwardly into said power chambers during the angular movement of the rotor, said pressure means having fluid connections with said inlet and discharge conduits; means for moving said vanes inwardly during the angular movement of the rotor; means for timing the action of said vane moving means in respect to any given power chamber; and means operable to render any one of said power chambers selectively effective or ineffective.

9. An hydraulic power transmitter combining an hydraulic motor having two diametrically disposed and non-communicating power chambers of different volumetric capacities; a source of supply fluid; selectively and independently operable valve means for directing the flow of supply fluid selectively through either of said power chambers thereby to drive the motor at one of two different speeds; and means equalizing the pressure on opposite sides of the idle power chamber.

10. An infinitely variable hydraulic power transmitter combining an hydraulic rotor unit comprising a stator element having two power chambers each of a different volumetric capacity, formed in its inner periphery and a single rotor element cooperating therewith; a source of liquid supply; independent valve means between each of said power chambers and said source for directing the flow of supply liquid selectively through either one of said power chambers thereby to drive the rotor unit at one of two different speeds; means for opening both sides of the power chamber not in the circuit to atmospheric pressure; and means for varying the speed of said rotor unit independently of said valve means.

11. An hydraulic motor comprising a rotor element and a cooperating stator element, said stator element being provided with two oppositely disposed power chambers; a conduit for supply fluid; valve means for directing said supply fluid through one of said power chambers independently of the other to drive the rotor element at a given speed; separate valve means for directing said supply fluid through the other of said power chambers and independently of the first mentioned power chamber thereby to drive the said rotor element at a different speed; and means operable to direct said supply fluid through both of said power chambers simultaneously thereby to drive the said rotor element at a speed different from the speed obtained when either of said power chambers is effective alone.

12. An hydraulic motor comprising a rotor element and a cooperating stator element, said stator element being provided with two oppositely disposed power chambers; a conduit for supply fluid; valve means operable selectively to direct said supply fluid through one of said power chambers independently of the other to drive the rotor element at a given speed, or to direct said supply fluid through the other of said power chambers and independently of the first mentioned power chamber thereby to drive the said rotor element at a different speed, or to direct said supply fluid through both of said power chambers simultaneously thereby to drive the said rotor element at a speed different from the speed obtained when either of said power chambers is effective alone; and means opening both sides of the power chamber not in circuit as a driving motor to atmospheric pressure.

13. An infinitely variable speed transmitter combining a plurality of hydraulic rotors of the vane type, each of said rotors having a first power chamber and a second power chamber, and each power chamber being of a different volumetric displacement; a driven shaft common to all of said rotors; means including a source of oil supply for rendering any one or any two or more of said power chambers selectively operative to drive said shaft at any one of a plurality of different speeds; means for opening both sides of the ineffective power chambers to atmospheric pressure; means for reversing the direction of movement of said driven shaft; and means for varying the speed of said shaft independently of the said means for rendering any one or any two or more of said rotors selectively operative.

14. An hydraulic power transmission combining a casing member; a driven shaft journaled in said casing; a plurality of hydraulic motor units mounted in said casing and operatively connected with said driven shaft, each of said motors being provided with two power chambers of different sizes; a separate fluid inlet and a separate fluid discharge conduit for each of said power chambers in each motor unit; separate control valve means in each of the said conduits for controlling the flow of fluid through the respective power chambers; and means operative to move the valves in the inlet and the discharge conduits of any given power chamber in unison.

15. An hydraulic power transmission for a machine tool combining a casing member; a driven shaft journaled in said casing; a plurality of hydraulic rotor units mounted in said casing and operatively connected with said driven shaft, each of said rotors being provided with two power chambers of different radial extent; a separate fluid inlet and a separate fluid discharge conduit for each of said power chambers in each rotor unit; separate control valve means in each of the said conduits for controlling the flow of fluid through the respective power chambers; and means interlocking the valves in the inlet and the discharge conduits of any given power chamber thereby to effect simultaneous movement of the said valves; and means operable from the exterior of said casing to actuate the respective control valves for the several power chambers.

16. A multiple speed hydraulic motor combining a casing; a driven shaft journaled thereon; a plurality of hydraulic rotors secured to said shaft and enclosed in said casing, each of said rotors having two power chambers of unequal sizes; a main liquid supply conduit and a main discharge conduit; a pair of branch conduits connected with the power chambers of each rotor, one of said pair of branch conduits connecting the power chamber with the main supply conduit and the other of said pair connecting the power chamber with the main discharge conduit; control valve means in said branch conduits; selectively operable means for actuating the control valves in any of said pairs of branch conduits simultaneously to an effective position thereby to cause said shaft to be driven at any one of various predetermined speeds; means for varying the rate of movement of the shaft in either direction of movement independently of said control valve means; therefore and means for opening the inlet and discharge sides of the power chambers not in the circuit to atmospheric pressure.

17. An infinitely variable multiple speed motor adapted to be propelled by an hydraulic medium derived from a constant source combining a driven shaft; a plurality of rotor assemblies secured thereto, each of said assemblies including two or more hydraulic motors; a housing for said rotors; means for rendering any one of said motors operative selectively or any two or more of said motors operative simultaneously thereby to effect the driving of said shaft at the speed determined by the displacement of any one motor or at the speed determined by the combined displacement of any two or more motors, said means comprising a main supply conduit, a plurality of branch conduits connected therewith and with each of said motors, independently operable valve means at the juncture of each of said branch and main conduits for controlling the flow of propelling fluid to the respective motors, each of said valves being so constructed and arranged as to control the flow of fluid through its associated branch conduit without affecting the action and function of the other valves; and means independent of said valve means for varying any of the speeds thereby obtained.

LAWRENCE LEE SCHAUER.

CERTIFICATE OF CORRECTION.

Patent No. 2,056,910.                                October 6, 1936.

LAWRENCE LEE SCHAUER.

It is hereby certified that error appears in the printed specification of the above numbered patent requiring correction as follows: Page 5, first column, line 27, claim 3, for "rotors" read motors; page 6, second column, line 39, claim 16, strike out the word "therefore"; and that the said Letters Patent should be read with these corrections therein that the same may conform to the record of the case in the Patent Office.

Signed and sealed this 15th day of December, A. D. 1936.

Henry Van Arsdale
Acting Commissioner of Patents.

(Seal)